(12) United States Patent
Mitsuda et al.

(10) Patent No.: US 6,350,064 B2
(45) Date of Patent: Feb. 26, 2002

(54) BIDIRECTIONAL OPTICAL SEMICONDUCTOR APPARATUS

(75) Inventors: Masahiro Mitsuda, Kyoto; Tohru Nishikawa, Osaka; Tomoaki Uno, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/886,973

(22) Filed: Jun. 25, 2001

Related U.S. Application Data (62) Division of application No. 09/261,960, filed on Mar. 3, 1999, now Pat. No. 6,264,377.

(30) Foreign Application Priority Data

Mar. 6, 1998 (JP) .......................................... 10-054641

(51) Int. Cl.[7] .................................................. G02B 6/36
(52) U.S. Cl. .............................. 385/88; 385/92; 385/49
(58) Field of Search ............................ 385/88–94, 14, 385/49, 50, 51

(56) References Cited

U.S. PATENT DOCUMENTS

| 5,485,538 A | 1/1996 | Bowen et al. |
| 5,487,124 A | 1/1996 | Bowen et al. |
| 6,019,523 A | 2/2000 | Honmou |
| 6,027,255 A | 2/2000 | Joo et al. |
| 6,085,005 A | 7/2000 | Gates et al. |
| 2001/0002942 A1 * | 6/2001 | Fukutomi ..................... 385/92 |

FOREIGN PATENT DOCUMENTS

WO    WO 97/06458    2/1997

* cited by examiner

Primary Examiner—Hemang Sanghavi
(74) Attorney, Agent, or Firm—Eric J. Robinson; Nixon Peabody LLP (57) ABSTRACT

A bidirectional optical semiconductor apparatus of the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; and a light-blocking member, formed on the surface of the semiconductor light-receiving device, for blocking the light emitted from the semiconductor light-emitting device.

31 Claims, 8 Drawing Sheets

BIDIRECTIONAL OPTICAL SEMICONDUCTOR APPARATUS

This application is a div. of Ser. No. 09/261,960 filed Mar. 3, 1999, U.S. Pat. No. 6,264,377.

BACKGROUND OF THE INVENTION

The present invention relates to a bidirectional optical semiconductor apparatus, and more particularly relates to a bidirectional optical semiconductor apparatus with enhanced optical isolation performance.

In recent years, a fiber-to-the-user system has been proposed for transmitting data from a base station to home users by way of optical fibers. In the fiber-to-the-user system, optical communication is established bidirectionally by providing optical transmitters and receivers for both the base station and the home users. Accordingly, an optical transmitter/receiver apparatus, including: an optical transmitter; an optical receiver; and an optical transmission line, is required. The optical transmitter may be a semiconductor light-emitting device for outputting an optical signal. The optical receiver may be a semiconductor light-receiving device like a photodiode for receiving the optical signal. And the optical transmission line may be a bundle of optical fibers for connecting the optical transmitter and receiver together.

In a prior art optical transmitter/receiver apparatus, an optical fiber for an optical transmitter, including a semiconductor laser device assembled in a package, is coupled to another optical fiber for an optical receiver, including a light-receiving device assembled in another package, via a coupler. Hereinafter, this apparatus will be called a "first conventional optical transmitter/receiver apparatus" for convenience of explanation.

Although commercially available optical transmitter and receiver can be used for this apparatus, such an apparatus is disadvantageous in view of downsizing and cost reduction, because separate optical transmitter and receiver should be coupled together via a coupler.

In order to solve such a problem, another prior art optical transmitter/receiver apparatus has a planar lightwave circuit (PLC) structure. The apparatus includes: a quartz substrate; semiconductor laser and light-receiving devices integrally supported by the substrate; and an optical waveguide formed within the substrate. Hereinafter, this apparatus will be referred to as a "second conventional optical transmitter/receiver apparatus".

In the second conventional optical transmitter/receiver apparatus, downsizing is realized to a certain degree by integrating the semiconductor laser and light-receiving devices on a single quartz substrate. However, since the area of the optical waveguide formed within the substrate can be no smaller than a certain limit, the size of the apparatus still cannot be regarded as sufficiently small. In addition, since the PLC should be connected to optical fibers, the cost effectiveness thereof is not totally satisfactory, either.

Figure 9:
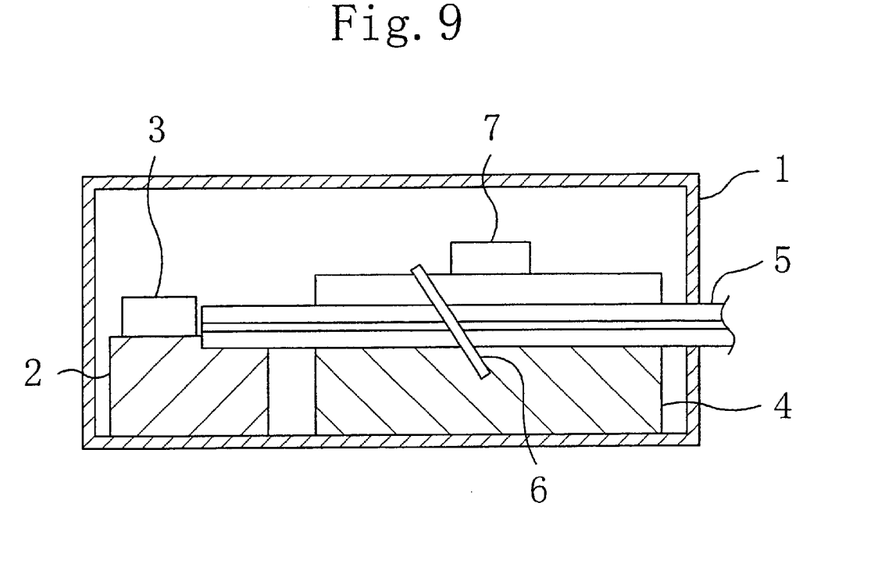
FIG. 9 is a side cross-sectional view of a bidirectional optical semiconductor apparatus used as a basis of the present invention.

Thus, the present inventors proposed a bidirectional optical semiconductor apparatus, such as that shown in FIG. 9, in PCT International Application No. WO97/06458. Specifically, a silicon substrate 2 is placed on the bottom of a package 1 on the left-hand side in FIG. 9. And a semiconductor laser device (i.e., an exemplary semiconductor light-emitting device) 3, for emitting "signal light" at a wavelength of 1.3 μm, for example, is fixed onto the upper surface of the silicon substrate 2. In this specification, the "signal light" means an optical signal, which is output from an optical transmitter, propagated through an optical waveguide and then received by an optical receiver in the form of light all through these processes. In the following description, the "signal light" in this sense will be simply referred to as "light", unless explicitly stated otherwise. On the right-hand side in FIG. 9, a glass substrate (i.e., an exemplary substrate) 4, having a groove extending in the direction of the optical axis, is placed on the bottom of the package 1. An optical fiber 5 (i.e., an exemplary optical waveguide) is embedded within the groove of the glass substrate 4 and one end of the optical fiber 5, closer to the laser device, is fixed onto the upper surface of the silicon substrate 2. A half mirror (i.e., an exemplary optical branching filter) 6 is inserted into the glass substrate 4 such that a predetermined angle is formed between the mirror 6 and the optical axis. The half mirror 6 transmits about 50% of the output light, incoming from the left of the optical fiber 5 at the wavelength of 1.3 μm, and reflects upward about 50% of the input light, incoming from the right of the optical fiber 5 also at the wavelength of 1.3 μm. On the upper surface of the glass substrate 4, a light-receiving device 7 such as a photodiode (i.e., an exemplary semiconductor light-receiving device) of a surface-receiving type is fixed for receiving the input light, reflected by the half mirror 6, and outputting photocurrent.

Since the substrate embedding the optical waveguide, the semiconductor light-emitting device and the optical branching filter are integrated within a single apparatus, the bidirectional optical semiconductor apparatus is advantageous in improving the ease of use and reducing the overall size thereof. However, this bidirectional optical semiconductor apparatus still has a problem regarding optical isolation. Specifically, since the light, emitted from the semiconductor light-emitting device, is partially received by the semiconductor light-receiving device, optical isolation adversely deteriorates.

During a relaxation time of certain duration immediately after the semiconductor light-emitting device has been driven with a pulse, the output light, emitted from the semiconductor light-emitting device, leaves some tailing light behind. Thus, with the light-emitting and light-receiving ends insufficiently isolated optically, when the input light is received by the semiconductor light-receiving device, the tailing component of the output light, emitted from the semiconductor light-emitting device, is also received by the receiving device to form noise with respect to the incoming light. As a result, the performance of the semiconductor light-receiving device deteriorates. Accordingly, in performing bidirectional optical communication, improvement of optical isolation plays a crucial role.

In the first conventional optical transmitter/receiver apparatus, deterioration in optical isolation is allegedly suppressed by coupling the optical fiber on the transmitting end to the optical fiber on the receiving end with an offset provided at the coupler.

In contrast, no measures have been taken to suppress the deterioration in optical isolation in the second conventional optical transmitter/receiver apparatus and in the bidirectional optical semiconductor apparatus disclosed by the present inventors in the above-identified patent application.

SUMMARY OF THE INVENTION

An object of the present invention is reducing the overall size and improving the optical isolation of a bidirectional optical semiconductor apparatus, in which a substrate with an optical waveguide, a semiconductor light-emitting device, an optical branching filter, and a semiconductor light-receiving device are integrated.

As will be described later, the substrate embeds an optical waveguide, through which output light and input light are propagated. The semiconductor light-emitting device emits the output light toward one end of the optical waveguide. The optical branching filter is provided for the optical waveguide for transmitting at least part of the output light and guiding at least part of the input light to the outside of the optical waveguide. And the semiconductor light-receiving device is provided over the substrate for receiving the input light guided by the optical branching filter to the outside of the optical waveguide.

Next, the optical isolation between the light-emitting and light-receiving ends in such a bidirectional optical semiconductor apparatus will be described based on the results of experiments carried out to analyze the reason why the isolation performance deteriorates, in particular.

First, specific results of experiments carried out to analyze the optical isolation between the light-emitting and light-receiving ends in the bidirectional optical semiconductor apparatus will be described. In the following description, output light, emitted from a semiconductor laser device 3 (i.e., an exemplary semiconductor light-emitting device) at a wavelength of 1.3 $\mu$m, is supposed to be input at one end of an optical fiber 5 (i.e., as an optical waveguide). Also, input light, transmitted at a wavelength of 1.3 $\mu$m, is supposed to be received at the other end of the optical fiber 5. And the half mirror 6 and photodiode 7 are supposed to be used as exemplary optical branching filter and semiconductor light-receiving device, respectively.

If the output light is emitted from the semiconductor laser device 3 at 10 mW, about 20% of the output light is coupled to the optical fiber 5. And about 50% of that portion of the output light, which has been coupled to the optical fiber 5, is transmitted through the half mirror 6 to be output to the outside. That is to say, in this case, the light is output from the optical fiber 5 to the outside at about 1 mW.

If the output power of the output light, which has been emitted from the semiconductor laser device 3 and then output to the outside through the optical fiber 5 with a bias voltage of −3 V applied to the light-receiving device 7, is 1 mW, then the photocurrent output from the light-receiving device 7 is 8.5 $\mu$A on average. On the other hand, if input light of 1 mW is received through the optical fiber 5 with a bias voltage of −3 V applied to the light-receiving device 7, then the photocurrent output from the light-receiving device 7 is 450 $\mu$A on average (i.e., average sensitivity is 0.45 A/W). Accordingly, he optical isolation between the light-emitting and light-receiving ends is 17 dB.

Next, it will be described based on the results of the experiments why the optical isolation between the light-emitting and light-receiving ends deteriorates in the bidirectional optical semiconductor apparatus.

Figure 10:
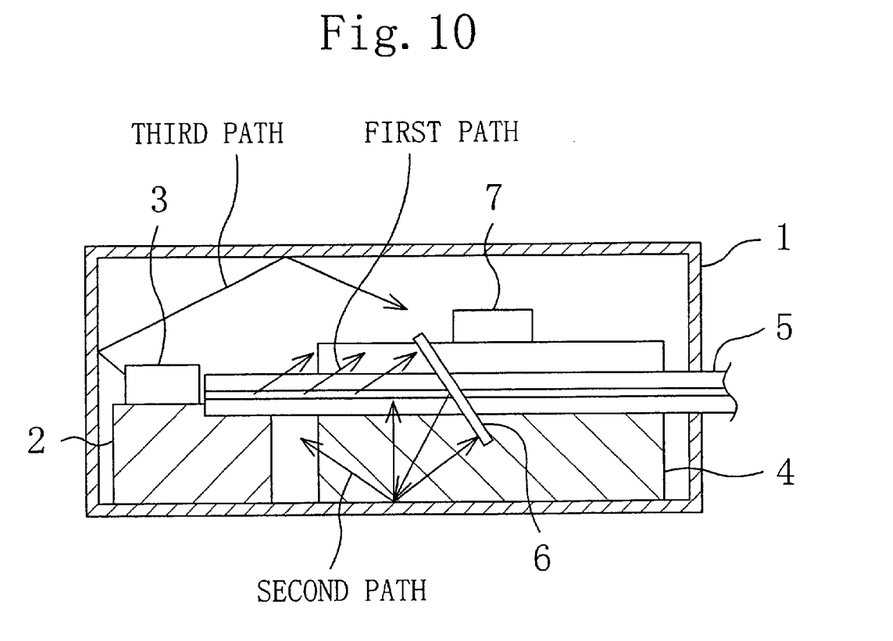
FIG. 10 is a side cross-sectional view illustrating problems intrinsic to the bidirectional optical semiconductor apparatus used as a basis of the present invention.

As a result of the experiments, the present inventors spotted the root of deterioration in optical isolation at a diversity of paths (mainly three), through which the output light, emitted from the semiconductor laser device 3, passes and is ultimately received at the light-receiving device 7. In FIG. 10, the first input path is defined for some components of the output light of the semiconductor laser device 3, which are propagated through the cladding of the optical fiber 5 and then leak therefrom to reach the light-receiving device 7 without being reflected by the package 1. In this specification, the light passing through this path will be referred to as "cladding leakage light". The second input path is defined for other components of the output light of the semiconductor laser device 3, which are reflected by the half mirror 6 and then reflected again at random by the bottom of the package 1 to reach the light-receiving device 7. In this specification, the light passing through this path will be referred to as "half-mirror reflected light". The third input path is defined for components of the output light emitted from the other end of the semiconductor laser device 3, opposite to the optical fiber 5, and then reflected at random by the side and upper surfaces of the package 1 to reach the light-receiving device 7. In this specification, the light passing through this path will be referred to as "package scattering light".

Based on these findings, the present invention provides various measures for preventing the cladding leakage light, half-mirror reflected light or package scattering light from being accidentally incident onto the semiconductor light-receiving device. Specifically, the present invention is implemented as a bidirectional optical semiconductor apparatus according to any of the following embodiments.

A first bidirectional optical semiconductor apparatus according to the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; and a light-blocking member, formed on the surface of the semiconductor light-receiving device, for blocking the light emitted from the semiconductor light-emitting device.

The first bidirectional optical semiconductor apparatus includes a light-blocking member, formed on the surface of the semiconductor light-receiving device, for blocking the light emitted from the semiconductor light-emitting device. Accordingly, components of light, which have been emitted from the semiconductor light-emitting device and then directed toward the semiconductor light-receiving device without being propagated through the optical waveguide, are blocked by the light-blocking member on the surface of the receiving device and not incident onto the receiving device. As a result, the optical isolation improves.

A second bidirectional optical semiconductor apparatus according to the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; and a light-blocking member, formed on the surface of the substrate, for blocking the light emitted from the semiconductor light-emitting device.

The second bidirectional optical semiconductor apparatus includes a light-blocking member, formed on the surface of the substrate, for blocking the light emitted from the semiconductor light-emitting device. Accordingly, components of light, which have been emitted from the semiconductor light-emitting device and then deviated from the optical waveguide, are blocked by the light-blocking member on the surface of the substrate and not incident onto the semiconductor light-receiving device. As a result, the optical isolation improves.

In the first or second bidirectional optical semiconductor apparatus, the light-blocking member is preferably a plastic film, a metal layer or a thin-film dielectric filter.

A third bidirectional optical semiconductor apparatus according to the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; and a highly reflective layer, provided on a surface of the substrate opposite to the semiconductor light-receiving device, for reflecting the light emitted from the semiconductor light-emitting device in a direction departing from the semiconductor light-receiving device at a high reflectivity.

The third bidirectional optical semiconductor apparatus includes a highly reflective layer, provided on a surface of the substrate opposite to the semiconductor light-receiving device, for reflecting the light emitted from the semiconductor light-emitting device in a direction departing from the semiconductor light-receiving device at a high reflectivity. Thus, the light, which has been emitted from the emitting device and deviated from the optical waveguide, is reflected by the highly reflective layer provided on the surface of the substrate opposite to the receiving device in a direction departing from the receiving device at a high reflectivity. And the light is not incident onto the semiconductor light-receiving device. As a result, the optical isolation improves.

A fourth bidirectional optical semiconductor apparatus according to the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; and a light-absorbing member, provided over part of the substrate other than the optical waveguide, for absorbing the light emitted from the semiconductor light-emitting device.

The fourth bidirectional optical semiconductor apparatus includes a light-absorbing member, provided over part of the substrate other than the optical waveguide, for absorbing the light emitted from the semiconductor light-emitting device. Thus, the light, which has been emitted from the semiconductor light-emitting device and deviated from the optical waveguide, is absorbed by the light-absorbing member provided over part of the substrate other than the optical waveguide, and not incident onto the semiconductor light-receiving device. As a result, the optical isolation improves.

A fifth bidirectional optical semiconductor apparatus according to the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; and an optical element, provided over part of the substrate other than the optical waveguide, for absorbing the light emitted from the semiconductor light-emitting device and deviated from the optical waveguide or for reflecting the light in a direction departing from the semiconductor light-receiving device.

The fifth bidirectional optical semiconductor apparatus includes an optical element, provided over part of the substrate other than the optical waveguide, for absorbing the light emitted from the semiconductor light-emitting device and deviated from the optical waveguide or for reflecting the light in a direction departing from the semiconductor light-receiving device. Thus, the light, which has been emitted from the semiconductor light-emitting device and deviated from the optical waveguide, is absorbed or reflected in a direction departing from the semiconductor light-receiving device by the optical element, and not incident onto the semiconductor light-receiving device. As a result, the optical isolation improves.

A sixth bidirectional optical semiconductor apparatus according to the present invention includes: a substrate embedding an optical waveguide, through which output light and input light are propagated; a semiconductor light-emitting device for emitting the output light toward one end of the optical waveguide; an optical branching filter, provided in the optical waveguide, for transmitting at least part of the output light and guiding at least part of the input light to the outside of the optical waveguide; a semiconductor light-receiving device, provided over the substrate, for receiving the input light guided by the optical branching filter to the outside of the optical waveguide; a package for housing the substrate, the semiconductor light-emitting device, the optical branching filter and the semiconductor light-receiving device; and a light-absorbing film, formed on an inner wall surface of the package, for absorbing the light emitted from the semiconductor light-emitting device.

The sixth bidirectional optical semiconductor apparatus includes a light-absorbing film, formed on an inner wall surface of the package, for absorbing the light emitted from the semiconductor light-emitting device. Thus, the light, which has been emitted from the semiconductor light-emitting device and deviated from the optical waveguide, is absorbed by the light-absorptive film on the inner wall surface of the package, and not incident onto the semiconductor light-receiving device. As a result, the optical isolation improves.

In one embodiment of the present invention, the substrate is preferably made of quartz glass, silicon crystals or polymers.

In another embodiment of the present invention, the optical branching filter is preferably an optical element provided to intersect with the optical waveguide.

In still another embodiment, the optical waveguide is preferably a core of an optical fiber embedded in a groove formed in the substrate.

In an embodiment where the optical waveguide is the core of the optical fiber, the optical fiber is preferably fixed by a fixing member to the substrate and embedded in the groove, and a refractive index of the fixing member is preferably smaller than a refractive index of a cladding of the optical fiber.

In another embodiment where the optical waveguide is the core of the optical fiber, the optical fiber is preferably fixed by a fixing member to the substrate and embedded in the groove. And a refractive index of the fixing member in a region thereof closer to the semiconductor light-receiving device is preferably smaller than a refractive index of a cladding of the optical fiber, while a refractive index of the fixing member in a region thereof distant from the semiconductor light-receiving device is preferably larger than the refractive index of the cladding of the optical fiber.

Then, the light, which has been emitted from the emitting device and then deviated from the core of the optical fiber, is confined in the optical fiber in the region closer to the receiving device and absorbed into the fixing member in the region distant from the receiving device. As a result, the optical isolation improves with much more certainty.

In still another embodiment where the optical waveguide is the core of the optical fiber, a refractive index of the substrate is preferably smaller than a refractive index of the cladding of the optical fiber.

In still another embodiment where the optical waveguide is the core of the optical fiber, a refractive index of the substrate in a region thereof closer to the semiconductor light-receiving device is preferably smaller than a refractive index of a cladding of the optical fiber, while a refractive index of the substrate in a region thereof distant from the semiconductor light-receiving device is preferably larger than the refractive index of the cladding of the optical fiber.

Then, the light, which has been emitted from the emitting device and then deviated from the core of the optical fiber, is confined in the optical fiber in the region closer to the receiving device and absorbed into the substrate in the region distant from the receiving device. As a result, the optical isolation improves with much more certainty.

DESCRIPTION OF THE PREFERRED EMBODIMENTS

Hereinafter, preferred embodiments of a bidirectional optical semiconductor apparatus according to the present invention will be described with reference to the accompanying drawings. Before the specific embodiments are detailed, respective members, used in common throughout the following embodiments, will be briefly described first with reference to FIG. 1(a) through FIG. 8.

As shown in FIG. 1(a) through FIG. 8, a silicon substrate 12 is placed on the left-hand side of the bottom of a package 11. And a semiconductor laser device 13 (i.e., an exemplary semiconductor light-emitting device) for emitting light at a wavelength of 1.3 $\mu$m, for example, is fixed onto the upper surface of the silicon substrate 12. On the right-hand side of the bottom of the package 11, a glass substrate 14 having a groove 14a extending in the direction of the optical axis is placed. An optical fiber 15 (i.e., an exemplary optical waveguide) is embedded in the groove 14a of the glass substrate 14 and one end of the optical fiber 15, closer to the laser device, is fixed onto the upper surface of the silicon substrate 12.

An optical branching filter 16 is inserted into the glass substrate 14 such that a predetermined angle is formed between the optical branching filter 16 and the optical axis. The optical branching filter 16 transmits at least part of the output light, emitted from the semiconductor laser device 13, and reflects at least part of the input light, received at the other end of the optical fiber 15, in a direction departing from the glass substrate 14, i.e., upward. The optical branching filter 16 may be a half mirror or a wavelength division multiplexed (WDM) filter, for example.

On the upper surface of the glass substrate 14, a light-receiving device 17 (i.e., an exemplary semiconductor light-receiving device) is fixed for receiving the input light, guided thereto by the optical branching filter 16, and outputting photocurrent. The light-receiving device 17 may be a photodiode of a surface-receiving type, for example.

EMBODIMENT 1

Figure 1A:
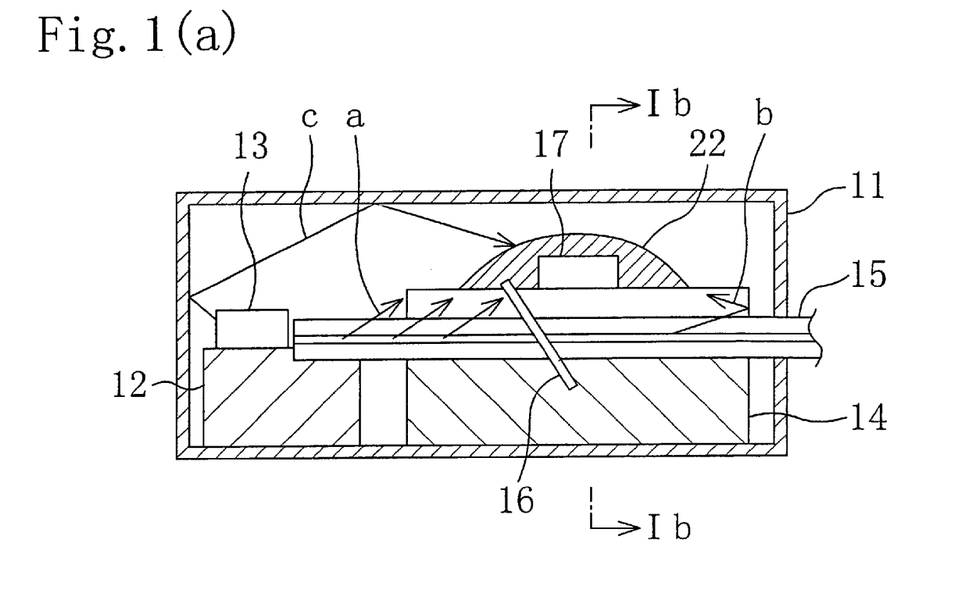
FIG. 1(a) is a side cross-sectional view of a bidirectional optical semiconductor apparatus according to the first embodiment of the present invention.
Figure 1B:
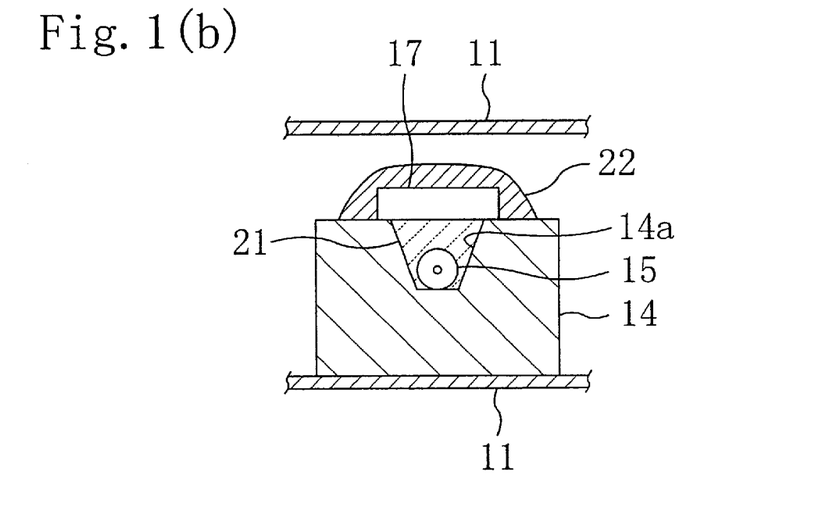
FIG. 1(b) is a cross-sectional view of the apparatus taken along the line Ib—Ib in FIG. 1(a).

Hereinafter, a bidirectional optical semiconductor apparatus according to the first embodiment will be described with reference to FIGS. 1(a) and 1(b). FIG. 1(a) is a side cross-sectional view of the bidirectional optical semiconductor apparatus of the first embodiment, while FIG. 1(b) is a cross-sectional view of the apparatus taken along the line Ib—Ib in FIG. 1(a).

In this first embodiment, the light-receiving device 17 is a photodiode of a surface-receiving type. And the optical fiber 15 is fixed within the groove 14a of the glass substrate 14 with a fixing resin 21.

Also, the light-receiving device 17 is coated with a light-blocking resin 22 with a thickness of about 0.5 mm. The resin 22 covers the lower surface (except for the light-receiving portion), side face closer to the laser device (on the left-hand side in FIG. 1(a)), side face opposite to the laser device (on the right-hand side in FIG. 1(a)) and upper surface of the device 17.

As the light-blocking resin 22, a ultraviolet-curable epoxy black resin, a thermosetting epoxy black resin, an epoxy black resin softening at an elevated temperature and curing at room temperature, a black pigment curing when the solvent evaporates, or the like may be used.

In the first embodiment, the light, which has been emitted from the laser device 13 and then directed toward the light-receiving device 17 without being propagated through the core of the optical fiber 15, is blocked by the light-blocking resin 22 and is not incident on the light-receiving device 17. As a result, the optical isolation considerably improves.

If the light-receiving device 17 is a photodiode of a surface-receiving type, non-negligible quantities of light are incident on the side and upper surfaces of the light-receiving device, as well as on the light-receiving surface thereof. However, in this embodiment, the light-receiving device 17 is entirely coated with the light-blocking resin 22 except for its light-receiving surface. Accordingly, the light, which has been emitted from the semiconductor laser device 13 and then directed toward the light-receiving device 17 without being propagated through the core of the optical fiber 15, can be blocked with much more certainty. As a result, the optical isolation noticeably improves.

Not all of these surfaces of the light-receiving device 17, i.e., lower surface (except for the light-receiving portion), side face closer to the laser device, side face opposite to the laser device and upper surface thereof, need to be coated with the light-blocking resin 22. Nevertheless, the larger the area of the light-receiving device 17 coated with the light-blocking resin 22, the more satisfactory the optical isolation.

The light, which has been emitted from the semiconductor laser device 13 and then coupled to the optical fiber 15, is propagated separately through the core and cladding of the optical fiber 15, respectively. The components of the light, which are propagated through the cladding of the optical fiber 15, are more likely to turn into radiated light and leak out of the cladding to reach the light-receiving device 17. In particular, in part of the optical fiber 15 embedded in the glass substrate 14, the refractive index of the cladding of the optical fiber 15 is not greatly different from that of the glass substrate 14. Accordingly, in that part, the light propagated through the cladding of the optical fiber 15 is even more likely to leak out. Thus, the cladding leakage light is believed to play a key role in deteriorating optical isolation.

In order to confirm our supposition, the present inventors measured the respective amounts of photocurrents resulting from the three types of light components passing through the paths a, b and c, where optical light is emitted from the optical fiber 15 at 1 mW. Specifically, some components of the cladding leakage light, directly reaching the light-receiving device 17, are identified by the path a. Other components of the cladding leakage light, which are reflected by the right end face of the glass substrate 14 and then reach the light-receiving device 17, are identified by the path b. And the package scattering light is identified by the path c. As a result, the photocurrent, resulting from the light components passing through the path a, was about 4 μA, which accounted for about a half of the crosstalk. The "crosstalk" herein means the photocurrent, resulting from the light emitted from the semiconductor laser device 13 and then incident onto the light-receiving device 17. The photocurrents, resulting from the respective light components passing through the paths b and c, were about 0.5 μA and about 1 μA.

Accordingly, if the lower surface (except for the light-receiving portion), side face closer to the laser device, side face opposite to the laser device and upper surface of the light-receiving device 17 are coated with the light-blocking resin 22, then the photocurrent output from the light-receiving device 17 is reduced by about 5.5 μA to be about 3 μA. As a result, the optical isolation can be increased up to 22 dB.

If necessary, the optical isolation can be further improved by coating not only these surfaces of the light-receiving device 17, but also part of the upper surface of the glass substrate 14, where the optical fiber 15 is embedded, or the entire upper surface thereof with the light-blocking resin 22.

Optionally, a pigment absorbing the light may be mixed into the material of the glass substrate 14, instead of coating that part of the upper surface of the glass substrate 14 where the optical fiber 15 is embedded or the entire upper surface thereof with the light-blocking resin 22. In such a case, the optical isolation can also be improved.

Modified Example of Embodiment 1

In the first embodiment, the lower surface (except for the light-receiving portion), respective side faces closer to, and opposite to, the laser device (on the left- and right-hand sides in FIG. 1(a)) and upper surface of the light-receiving device 17 are coated with the light-blocking resin 22. In this modified embodiment, these surfaces, i.e., lower surface (except for the light-receiving portion), side face closer to the laser device, side face opposite to the laser device and upper surface thereof, are covered with a light-blocking layer.

The light-blocking layer may be a thin-film dielectric filter, attached to the light-receiving device 17, for blocking the light on the wavelength band of the laser light emitted from the semiconductor laser device 13. Alternatively, the light-blocking layer may be a metal thin film attached to the light-receiving device 17 or a metal layer formed on the surface of the light-receiving device 17 by plating or evaporation.

If the light-blocking resin 22 is applied as in the first embodiment, then the height of the package 11 is increased by the thickness of the light-blocking resin 22. However, by providing the light-blocking layer as in this modified embodiment, it is possible to prevent the height of the package 11 from increasing.

In attaching a thin-film dielectric filter to the surface of the light-receiving device 17, the wavelength band of the light to be blocked can be selected easily, which is advantageous in designing the apparatus.

Also, if the light-blocking layer is provided only on the upper surface of the light-receiving device 17, a wide area can be secured for the light-blocking layer and the process of providing the light-blocking layer can be performed more easily.

EMBODIMENT 2

Figure 2A:
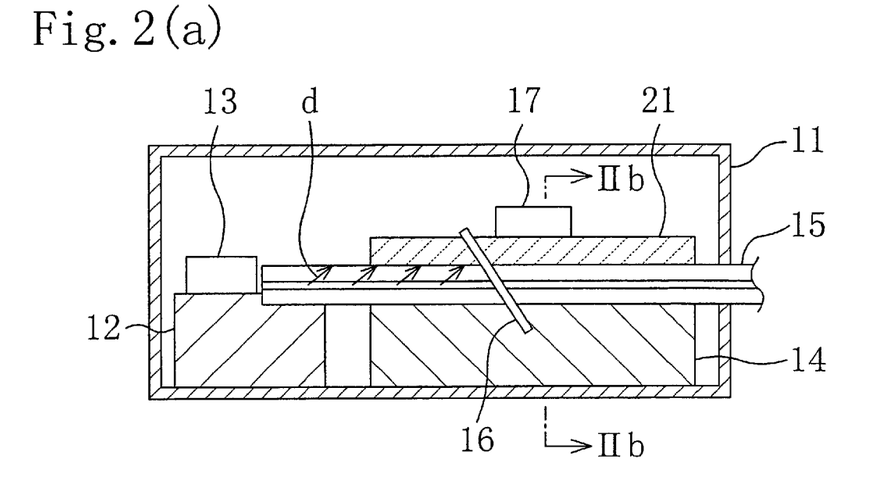
FIG. 2(a) is a side cross-sectional view of a bidirectional optical semiconductor apparatus according to the second embodiment of the present invention.
Figure 2B:
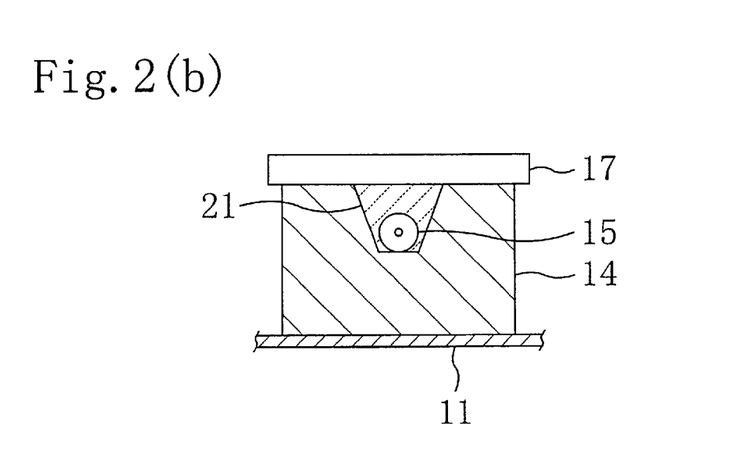
FIG. 2(b) is a cross-sectional view of the apparatus taken along the line IIb—IIb in FIG. 2(a).

Next, a bidirectional optical semiconductor apparatus according to the second embodiment of the present invention will be described with reference to FIGS. 2(a) and 2(b). FIG. 2(a) is a side cross-sectional view of the bidirectional optical semiconductor apparatus of the second embodiment, while FIG. 2(b) is a cross-sectional view of the apparatus taken along the line IIb—IIb in FIG. 2(a).

In the second embodiment, the light-receiving device 17 is a photodiode of a surface-receiving type. And the optical fiber 15 is fixed within the groove 14a of the glass substrate 14 with a fixing resin 21 having a refractive index lower than that of the cladding of the optical fiber 15.

The refractive index of the fiber cladding of a quartz singlemode optical fiber 15 for propagating light on the wavelength band of 1.3 $\mu$m is 1.447. Thus, in this embodiment, a resin having a refractive index of 1.445 is used as the fixing resin 21.

As described above, the light components, which are emitted from the semiconductor laser device 13, coupled to the optical fiber 15 and then propagated through the cladding thereof, are more likely to turn into radiated light and leak out of the cladding to reach the light-receiving device 17.

However, in this embodiment, the optical fiber 15 is fixed to the groove 14a of the glass substrate 14 with a fixing resin 21 having a refractive index lower than that of the cladding of the optical fiber 15. Accordingly, the light, propagated through the cladding of the optical fiber 15, is confined in the cladding by the fixing resin 21 and does not leak out of the cladding. As a result, the deterioration in optical isolation, resulting from the cladding leakage light, can be suppressed.

The photocurrent of the bidirectional optical semiconductor apparatus of the second embodiment, where light is output from the optical fiber 15 at 1 mW, is about 1 $\mu$A and the optical isolation can be increased up to about 27 dB.

In the second embodiment, the crosstalk of about 4 $\mu$A, resulting from some components of the cladding leakage light, which directly reach the light-receiving device 17 (identified by the path a in FIG. 1(a)); the crosstalk of about 0.5 $\mu$A, resulting from other components of the cladding leakage light, which are reflected by the right end face of the glass substrate 14 and then reach the light-receiving device 17 (identified by the path b in FIG. 1(a)); and the crosstalk of about 1.5 $\mu$A, resulting from still other components of the cladding leakage light, which are directly incident on the light-receiving portion of the light-receiving device 17 (identified by the path d in FIG. 2(a)) can be all reduced. In particular, the crosstalk, resulting from the components of the cladding leakage light, which are directly incident on the light-receiving portion of the light-receiving device 17, can be suppressed in this second embodiment, not in the first embodiment.

Instead of fixing the optical fiber 15 with the fixing resin 21 having a refractive index lower than that of the fiber cladding, the glass substrate 14 may be made of a material having a refractive index lower than that of the fiber cladding. In such a case, the light, leaking out of the fiber cladding laterally or downward, can be confined within the groove 14a of the glass substrate 14. Accordingly, even if the light-receiving surface (lower surface) of the light-receiving device 17 is wide enough to receive the light passing through the side faces of the glass substrate 14 as shown in FIG. 2(b), the optical isolation still can be improved. Also, if the light-receiving device 17 is fixed on the lower surface of the glass substrate 14, the optical isolation can also be improved.

EMBODIMENT 3

Figure 3:
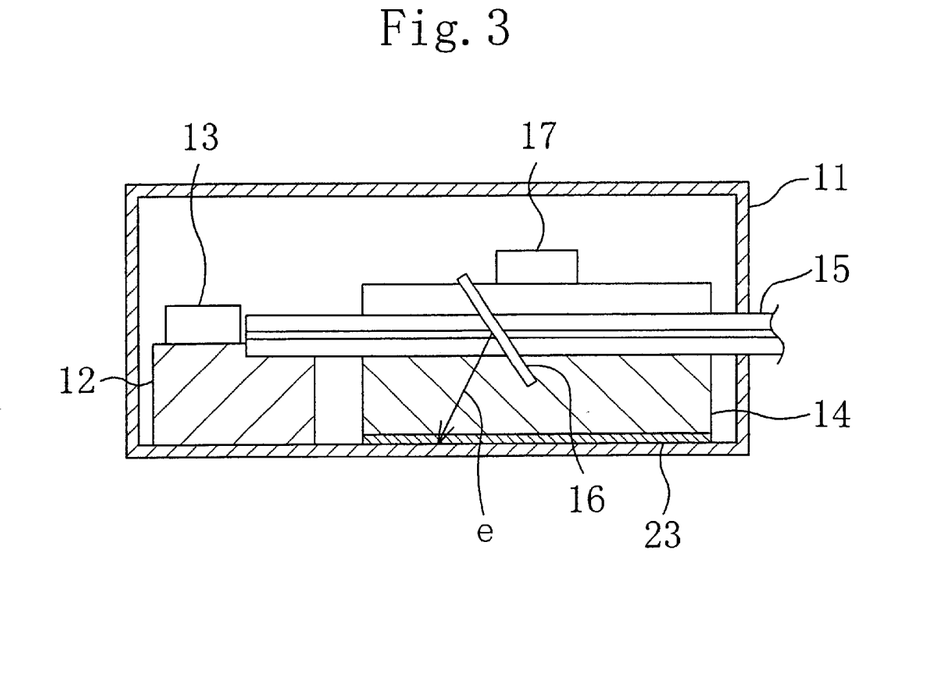
FIG. 3 is a side cross-sectional view of a bidirectional optical semiconductor apparatus according to the third embodiment of the present invention.

Next, a bidirectional optical semiconductor apparatus according to the third embodiment of the present invention will be described with reference to FIG. 3.

In the third embodiment, the optical branching filter 16 is a half mirror, the light-receiving device 17 is a photodiode of a surface-receiving type, and a light-blocking member 23 is provided between the glass substrate 14 and the package 11.

As the light-blocking member 22, any appropriate member, blocking the light on the wavelength band of the output light emitted from the semiconductor laser device 13, may be used. For example, a ultraviolet-curable epoxy black resin, a thermosetting epoxy black resin, an epoxy black resin softening at an elevated temperature and curing at room temperature, a black pigment curing when the solvent evaporates, a metal plate, etc., may be used.

The output light, which has been emitted from the semiconductor laser device 13, is coupled to the optical fiber 15. And about 20% of the output light is coupled to the core of the optical fiber 15 and propagated therethrough. In employing a half mirror as the optical branching filter 16, about half of the light propagated through the core of the optical fiber 15 is reflected by the half mirror 16 downward, i.e., toward the glass substrate 14, as indicated by the path e in FIG. 3. Then, the light is reflected again at random by the lower surface of the glass substrate 14 or the upper bottom surface of the package 11 to reach the light-receiving device 17.

In this embodiment, the light-blocking member 23 is provided between the glass substrate 14 and the package 11. In such a case, the light, which is reflected by the half mirror during the propagation through the fiber core, is blocked by the light-blocking member 23 and not directed toward the light-receiving device 17. As a result, the optical isolation can be remarkably improved.

The optical isolation of the bidirectional optical semiconductor apparatus of the third embodiment was evaluated by modeling an apparatus with the optical fiber 15 sufficiently extended and bent between the semiconductor laser device 13 and the glass substrate 14 to totally eliminate the light propagated through the fiber cladding. And respective amounts of photocurrents, flowing when light was output from the optical fiber 15 at 1 mW, were measured by varying the states of the lower surface of the glass substrate 14 and the upper bottom surface of the package 11.

First, the photocurrent was measured to be 1.5 $\mu$A where the upper bottom surface of the package 11 was roughened by cutting.

Next, the photocurrent was measured to be 0.18 $\mu$A where a black light-blocking member 23 was provided between the glass substrate 14 and the package 11. Accordingly, it was confirmed that the optical isolation is greatly improved according to this third embodiment.

Modified Example of Embodiment 3

The light propagated through the core of the optical fiber 15 in the groove 14a of the glass substrate 14 expands within an angular range of 5 degrees. Accordingly, the expansion angle of the light propagated through the core is negligible. In view of that, a highly reflective layer may be formed on the lower surface of the glass substrate 14 to reflect the light, emitted from the semiconductor laser device 13 in a direction departing from the light-receiving device 17, at a high reflectivity. In such a case, the light, reflected by the half mirror during the propagation through the core of the optical fiber 15, is not reflected at random by the lower surface of the glass substrate 14, but reflected in the direction departing from the light-receiving device 17. As a result, the optical isolation improves to a large degree.

If the angle formed between the optical branching filter 16 and a plane vertical to the optical fiber 15 was set at 30 degrees and a highly reflective layer was formed on the lower surface of the glass substrate 14, the photocurrent was measured to be 0.009 μA. In this case, the optical isolation is 47 dB, which is much higher than usual.

The highly reflective layer may be formed on the lower surface of the glass substrate 14 by any of the following techniques. A mirror-polished silicon substrate may be fixed on the lower surface of the glass substrate 14. The lower surface of the glass substrate 14 itself may be mirror polished or plated with a metal such as Au, Ti or Ni thereon. Among all these techniques, plating the lower surface of the glass substrate 14 with a metal is advantageous in realizing uniform and constant reflectivity and reducing the cost.

As described above, the expansion angle of the light propagated through the core of the optical fiber 15 within the groove 14a of the glass substrate 14 is negligible. Thus, by forming the highly reflective layer on the lower surface of the glass substrate 14, deterioration in optical isolation can also be suppressed even if the angle formed between the optical branching filter 16 and the plane vertical to the optical fiber 15 is smaller than 30 degrees. Even if the expansion angle of the light, propagated through the fiber core within the groove 14a of the glass substrate 14, is large, deterioration in optical isolation can be reduced by narrowing the angle between the optical branching filter 16 and the plane vertical to the optical fiber 15.

EMBODIMENT 4

Next, a bidirectional optical semiconductor apparatus according to the fourth embodiment of the present invention will be described with reference to FIG. 4.

In the fourth embodiment, the optical branching filter 16 is a half mirror or a WDM filter, the light-receiving device 17 is a photodiode of a surface-receiving type, and a filter 24 is further provided not to cross the core of the optical fiber 15. The filter 24 is an optical element like a half mirror or WDM filter for absorbing the light, emitted from the semiconductor laser device 13 and deviated from the core of the optical fiber 15, or reflecting the light in a direction departing from the light-receiving device 17.

Figure 4:
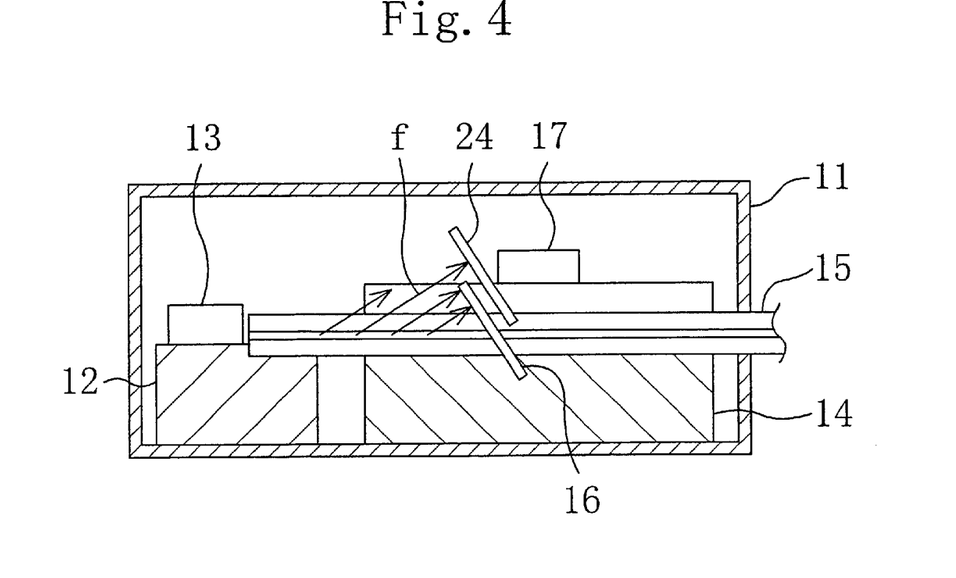
FIG. 4 is a side cross-sectional view of a bidirectional optical semiconductor apparatus according to the fourth embodiment of the present invention.

As indicated by the path f in FIG. 4, the components of the cladding leakage light, which do not reach or pass through the optical branching filter 16, reach the light-receiving device 17. In particular, if the optical branching filter 16 is a WDM filter, the light propagated through the cladding of the optical fiber 15 passes through the WDM filter.

In this embodiment, the filter 24 is provided between the optical branching filter 16 and the light-receiving device 17 to prevent the light on the wavelength band of the light emitted from the semiconductor laser device 13 from reaching the light-receiving device 17. Accordingly, the components of the cladding leakage light, which do not reach or pass through the optical branching filter 16, do not reach the light-receiving device 17. As a result, the optical isolation can be improved.

Modified Example of Embodiment 4

Suppose the wavelength band of the output light emitted from the semiconductor laser device 13 (e.g., 1.3 μm) is different from that of the input light received at the optical fiber 15 (e.g., 1.55 μm) and the optical branching filter 16 is a WDM filter. In such a case, the light propagated through the cladding of the optical fiber 15 passes through the optical branching filter 16.

Accordingly, in this case, a WDM filter, for passing the input light but not passing the output light therethrough, is provided between the light-receiving device 17 and the glass substrate 14 along the light-receiving surface of the light-receiving device 17. Then, it is possible to prevent the components of the light, emitted from the semiconductor laser device 13 and then leaked out of the cladding of the optical fiber 15, from reaching the light-receiving device 17. As a result, the optical isolation can be improved.

EMBODIMENT 5

Figure 5:
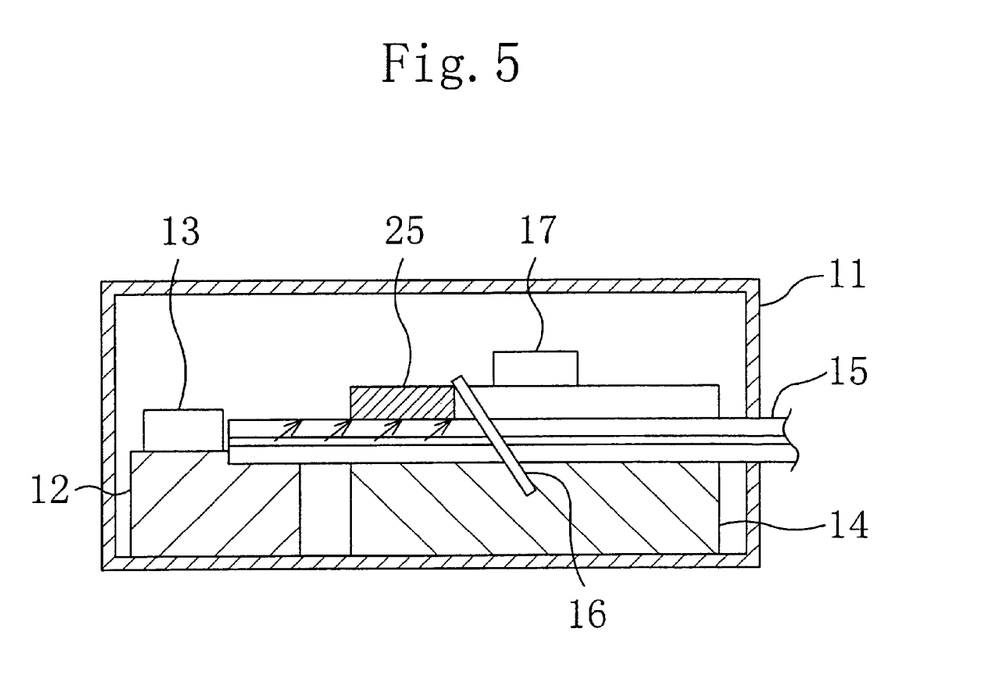
FIG. 5 is a side cross-sectional view of a bidirectional optical semiconductor apparatus according to the fifth embodiment of the present invention.

Next, a bidirectional optical semiconductor apparatus according to the fifth embodiment of the present invention will be described with reference to FIG. 5.

In the fifth embodiment, the optical branching filter 16 is a half mirror or a WDM filter. The light-receiving device 17 is a photodiode of a surface-receiving type. And part of the optical fiber 15, closer to the semiconductor laser device 3 than the optical branching filter 16, is fixed by a light-blocking resin 25 within the groove 14a of the glass substrate 14.

In such a case, the cladding leakage light is blocked by the light-blocking resin 25 and does not reach the light-receiving device 17, because the expansion angle of the light propagated through the cladding of the optical fiber 15 is small. As a result, the optical isolation improves.

Modified Example of Embodiment 5

In this modified example, that part of the optical fiber 15 closer to the semiconductor laser device 13 than the optical branching filter 16 is fixed by a fixing resin within the groove 14a of the glass substrate 14. The fixing resin has a refractive index higher than that of the cladding of the optical fiber 15 (e.g., 1.447).

In such a case, the light propagated through the cladding of the optical fiber 15 is absorbed into the fixing resin beforehand and the components of the cladding leakage light reaching the light-receiving device 17 decrease. As a result, the optical isolation also improves.

EMBODIMENT 6

Figure 6A:
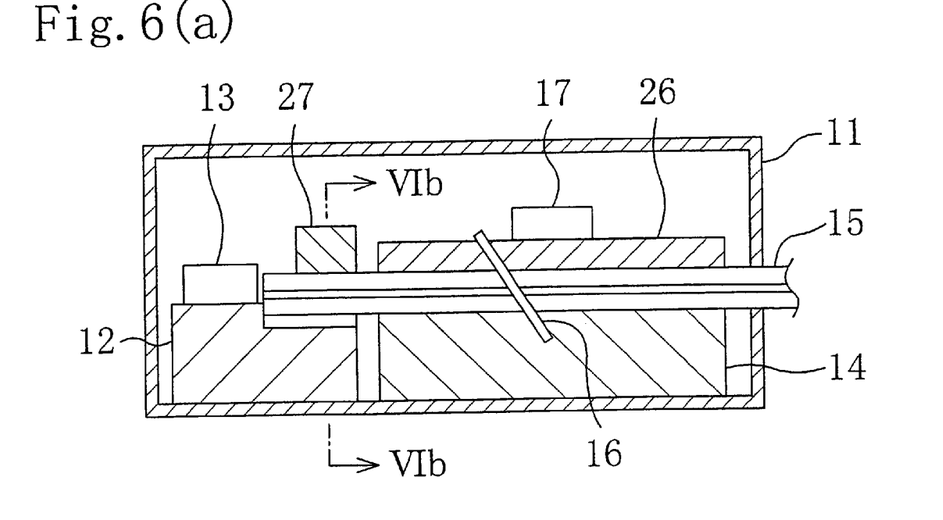
FIG. 6(a) is a side cross-sectional view of a bidirectional optical semiconductor apparatus according to the sixth embodiment of the present invention.

Next, a bidirectional optical semiconductor apparatus according to the sixth embodiment of the present invention will be described with reference to FIGS. 6(a) and 6(b). FIG. 6(a) is a side cross-sectional view of the bidirectional optical semiconductor apparatus of the sixth embodiment, while FIG. 6(b) is a cross-sectional view of the apparatus taken along the line VIb—VIb in FIG. 6(a).

In the sixth embodiment, the optical branching filter 16 is a half mirror or a WDM filter. The light-receiving device 17 is a photodiode of a surface-receiving type. And the optical fiber 15 is inserted into the groove 14a with a V-shaped cross section of the glass substrate 14 and pressed against the substrate 14 by a pressing member 26 having a groove with a trapezoidal cross section.

Figure 6B:
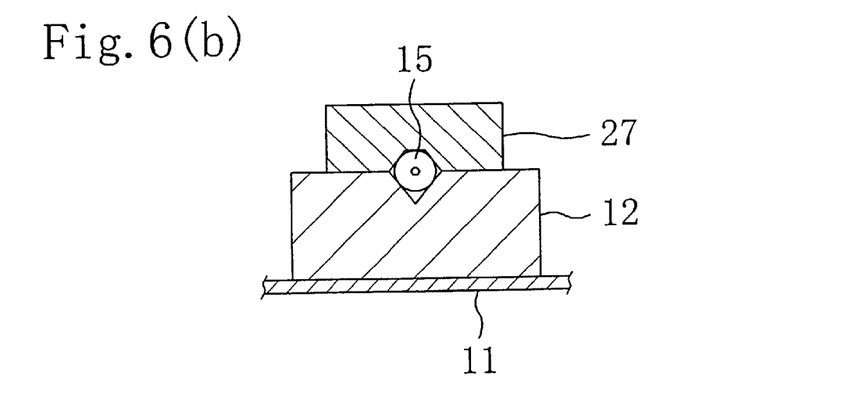
FIG. 6(b) is a cross-sectional view of the apparatus taken along the line VIb—VIb in FIG. 6(a).

As shown in FIG. 6(b), the end of the optical fiber 15, closer to the laser, is inserted into a V-shaped groove of the silicon substrate 12 and fixed to the substrate 12 by a light-blocking member 27 having a trapezoidal groove. In this case, the light-blocking member 27 is adhered to the silicon substrate 12 while pressing the end of the optical fiber 15 against the substrate 12.

The expansion angle of the laser light, emitted from the semiconductor laser device 13, is 10-odd degrees. Thus, the components of the laser light, which have been emitted from the semiconductor laser device 13 and are not coupled to the optical fiber 15, are radiated out of the optical fiber 15. And the light, which has been radiated out of the optical fiber 15, is propagated within the space inside the package 11 and then reflected by the wall faces of the package 11 to reach the light-receiving device 17.

However, by providing the light-blocking member 27 on the silicon substrate 12 as in this embodiment, the components of the laser light, emitted from the semiconductor laser device 13 and not coupled to the optical fiber 15, are blocked by the light-blocking member 27. Thus, the light components are neither propagated within the internal space of the package 11 nor incident on the light-receiving device 17. As a result, the optical isolation improves.

EMBODIMENT 7

Figure 7:
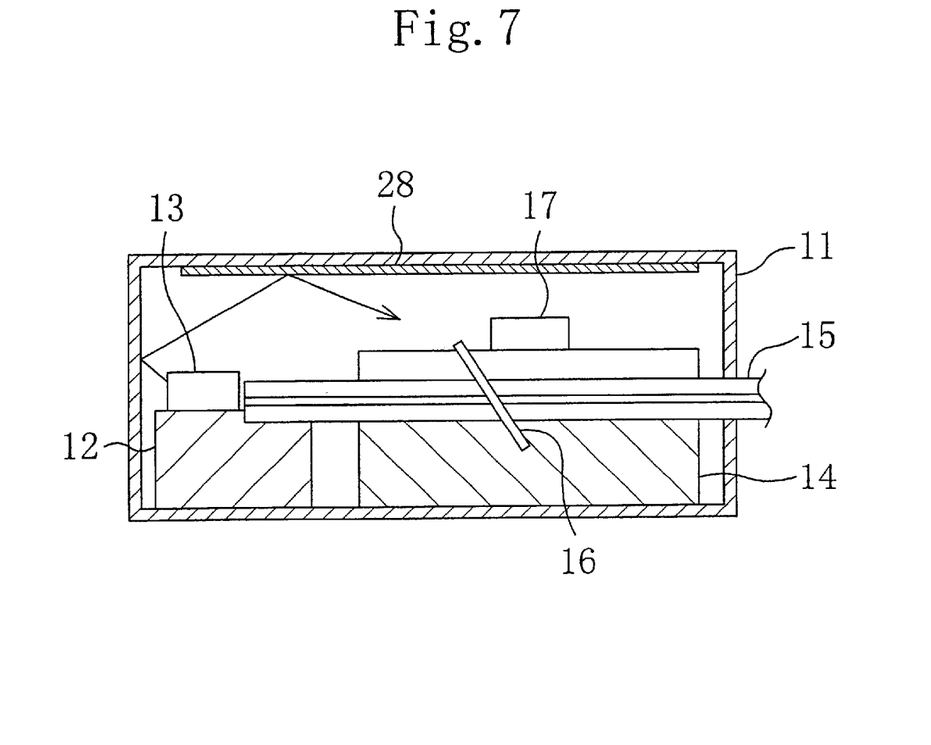
FIG. 7 is a side cross-sectional view of a bidirectional optical semiconductor apparatus according to the seventh embodiment of the present invention.

Next, a bidirectional optical semiconductor apparatus according to the seventh embodiment of the present invention will be described with reference to FIG. 7.

In the seventh embodiment, the optical branching filter 16 is a half mirror or a WDM filter, and the light-receiving device 17 is a photodiode of a surface-receiving type.

Also, a light-absorbing member 28 for absorbing the laser light emitted from the semiconductor laser device 13 is attached to the upper bottom surface of the package 11.

The light-absorbing member 28 may be a thin film absorbing the light on the wavelength band of the laser light emitted from the semiconductor laser device 13. Specifically, a coating containing a pigment absorbing the laser light emitted from the semiconductor laser device 13 may be used.

In the seventh embodiment, since the light-absorbing member 28 is attached to the upper bottom surface of the package 11, it is possible to prevent the light, scattering inside the package 11, from reaching the light-receiving device 17. As a result, the optical isolation improves.

In the foregoing first through seventh embodiments, the optical fiber 15 is used as an exemplary optical waveguide for propagating and outputting the output light emitted from the semiconductor laser device 13 therethrough. Alternatively, a transparent substrate, which is made of silicon crystals or polymers and can transmit light, may be used instead of the glass substrate 14, and an alternate optical waveguide may be formed within the transparent substrate.

Also, in the foregoing first through seventh embodiments, the output light, emitted from the semiconductor laser device 13, is supposed to be on the wavelength band of 1.3 $\mu$m, while the input light received by the optical fiber 15 is supposed to be on the wavelength band of 1.3 $\mu$m or 1.55 $\mu$m. Alternatively, the output light may be on the wavelength band of 1.55 $\mu$m or on a short wave band of 0.85, 0.78 or 0.65 $\mu$m.

Also, the semiconductor light-emitting device may be a light-emitting diode, not the semiconductor laser device 13.

Although each of the foregoing first through seventh embodiments and respective modified examples thereof may be employed by itself, if some of these are used in combination, then the optical isolation can be further improved.

EMBODIMENT 8

Next, a bidirectional optical transmission system, to which a bidirectional optical semiconductor apparatus according to any of the first through seventh embodiments and respective modified examples thereof is applicable, will be described as an eighth embodiment with reference to FIG. 8.

Figure 8:
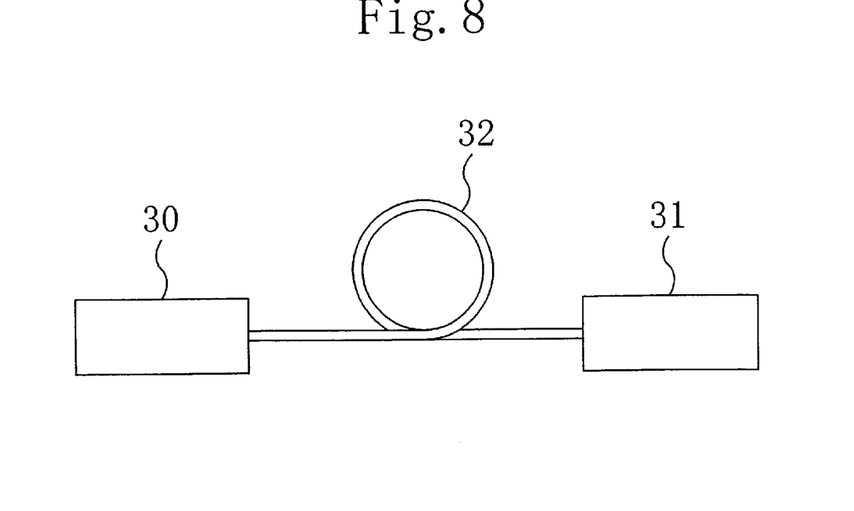
FIG. 8 is a schematic representation illustrating an overall arrangement of a bidirectional optical transmission system to which bidirectional optical semiconductor apparatuses according to the first to seventh embodiments of the present invention and respective modified examples thereof are applicable.

FIG. 8 illustrates an overall arrangement of the bidirectional optical transmission system. As shown in FIG. 8, a first bidirectional optical semiconductor apparatus 30 provided for a base station and a second bidirectional optical semiconductor apparatus 31 provided for a home user are connected to each other via a bundle of optical fibers 32 for transmission.

In the eighth embodiment, a bidirectional optical semiconductor apparatus with improved optical isolation according to any of the first through seventh embodiments and respective modified examples thereof is applied to the first and second bidirectional optical semiconductor apparatuses 30 and 31. Accordingly, a guard time, required for preventing crosstalk from being caused in a signal transmitted, can be shortened. As a result, the response speed of a bidirectional optical transmission system can be even more increased.

EMBODIMENT 9

Figure 11A:
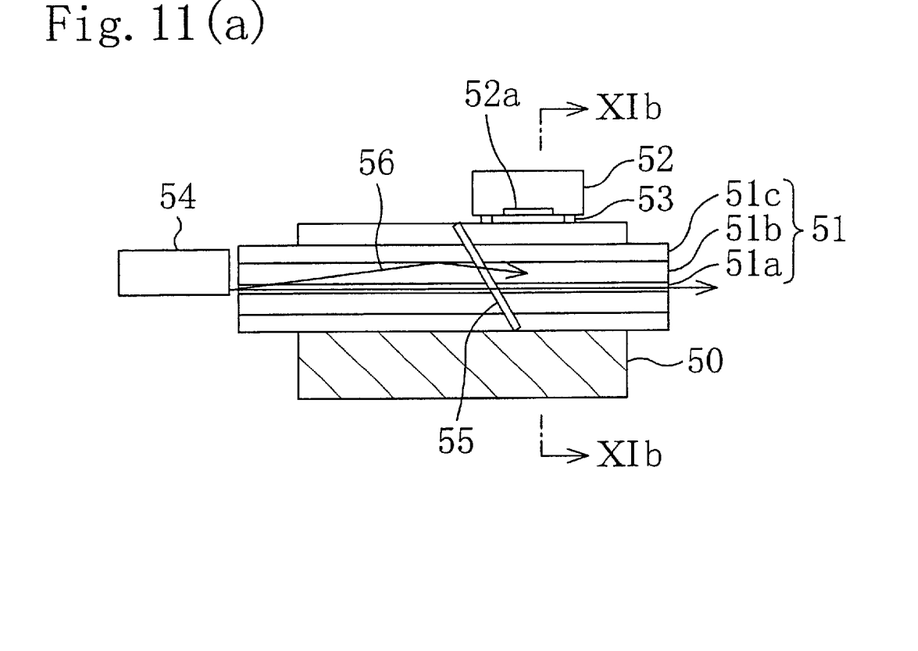
FIG. 11(a) is a side cross-sectional view of a bidirectional optical semiconductor apparatus according to the ninth embodiment of the present invention.
Figure 11B:
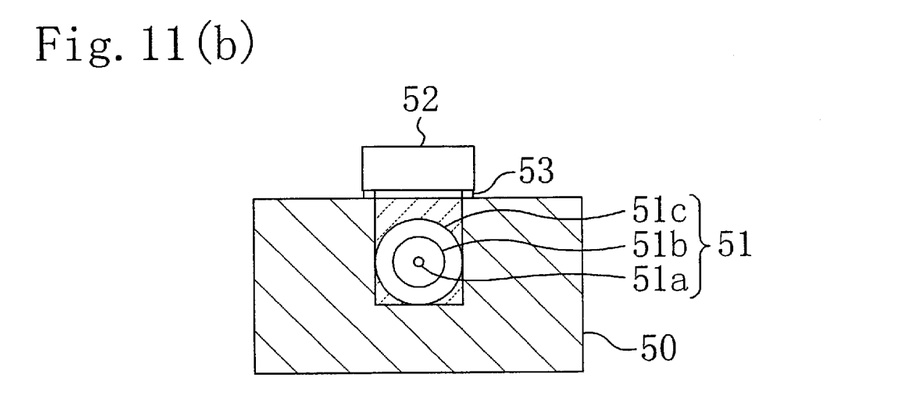
FIG. 11(b) is a cross-sectional view of the apparatus taken along the line XIb—XIb in FIG. 11(a).

Hereinafter, a bidirectional optical semiconductor apparatus according to the ninth embodiment of the present invention will be described with reference to FIGS. 11(*a*) and 11(*b*).

In the ninth embodiment, a double-cladding optical fiber 51, made of quartz singlemode fiber, is fixed inside the groove of a glass substrate 50. And a light-receiving device 52, which is implemented as a photodiode of a surface-receiving type and includes a light-receiving portion 52*a*, is fixed on the principal surface of the glass substrate 50. In this case, the electrode of the light-receiving device 52 is connected to the electrode on the glass substrate 50 via a bump 53.

The double-cladding optical fiber 51 consists of: a core 51*a*; a first cladding 51*b* formed on the outer periphery of the core 51*a*; and a second cladding 51*c* formed on the outer periphery of the first cladding 51*b*. The refractive index of the second cladding 51*c* is lower than that of the first cladding 51*b*. For example, if light is incident onto the fiber at a wavelength of 1.3 $\mu$m, then the refractive index of the first cladding 51*b* is 1.447, while the refractive index of the second cladding 51*c* is 1.445. Accordingly, the light propagated in cladding mode is confined within the second cladding 51*c*.

The light, emitted from a semiconductor laser device 54, i.e., an exemplary semiconductor light-emitting device, is coupled to the core 51*a* of the double-cladding optical fiber 51 and then output from the module to the outside. On the other hand, the light, which has been incident from the outside onto the double-cladding optical fiber 51, is reflected by a filter 55 and then received by the light-receiving device 52.

The components of the light, emitted from the semiconductor laser device 54 and transmitted in waveguide and cladding modes, are coupled to the core 51*a* of the double-cladding optical fiber 51. However, the light components in the cladding mode are easily turned into radiated light. In addition, in part of the double-cladding optical fiber 51, which is embedded in the glass substrate 50, the refractive indices of the fiber and the substrate are not so different, and the light cannot be confined within the cladding satisfactorily. As a result, the light in the cladding mode is likely to leak out of the double-cladding optical fiber 50. Accordingly, only the light in the waveguide mode is propagated through the core 51a of the double-cladding optical fiber 50.

If current is injected into the semiconductor laser device 54 to output laser light at 1 mW from the output end of the double-cladding optical fiber 51 and a reverse bias of 3 V is applied to both terminals of the light-receiving device 52, then resulting photocurrent is measured to be 0.8 $\mu$A. The photocurrent can be converted into an optical isolation of about −28 dB, which is superior to −22 dB conventionally attained.

The light 56, emitted from the semiconductor laser device 54 and then directly incident on the light-receiving device 52, cannot be removed with a light-blocking resin provided on the glass substrate 50, nor does the embedded structure where the optical fiber is fixed with a resin having a low refractive index. However, by using the double-cladding optical fiber 50 where the refractive index of the second cladding 51c is lower than that of the first cladding 51b, the light 56, emitted from the semiconductor laser device 54 and then directly incident on the light-receiving device 52, can be removed. Accordingly, a very effective structure can be attained according to the ninth embodiment.

What is claimed is:

1. A bidirectional optical semiconductor apparatus comprising:
   a substrate embedding an optical waveguide, through which output light and input light are propagated;
   a semiconductor light-emitting device for emitting the output light toward one end of the optical waveguide;
   an optical branching filter, provided in the optical waveguide, for transmitting at least part of the output light and guiding at least part of the input light to the outside of the optical waveguide;
   a semiconductor light-receiving device, provided over the substrate, for receiving the input light guided by the optical branching filter to the outside of the optical waveguide; and
   a light-blocking member, formed on the surface of the substrate, for blocking the light emitted from the semiconductor light-emitting device.

2. The apparatus of claim 1, wherein the light-blocking member is a plastic film, a metal layer or a thin-film dielectric filter.

3. The apparatus of claim 1, wherein the substrate is made of quartz glass, silicon crystals or polymers.

4. The apparatus of claim 1, wherein the optical branching filter is an optical element provided to intersect with the optical waveguide.

5. The apparatus of claim 1, wherein the optical waveguide is a core of an optical fiber embedded in a groove formed in the substrate.

6. The apparatus of claim 5, wherein the optical fiber is fixed by a fixing member to the substrate and embedded in the groove, and
   wherein a refractive index of the fixing member is smaller than a refractive index of a cladding of the optical fiber.

7. The apparatus of claim 5, wherein a refractive index of the substrate is smaller than a refractive index of a cladding of the optical fiber.

8. A bidirectional optical semiconductor apparatus comprising:
   a substrate embedding an optical waveguide, through which output light and input light are propagated;
   a semiconductor light-emitting device for emitting the output light toward one end of the optical waveguide;
   an optical branching filter, provided in the optical waveguide, for transmitting at least part of the output light and guiding at least part of the input light to the outside of the optical waveguide;
   a semiconductor light-receiving device, provided over the substrate, for receiving the input light guided by the optical branching filter to the outside of the optical waveguide; and
   a highly reflective layer, provided on a surface of the substrate opposite to the semiconductor light-receiving device, for reflecting the light emitted from the semiconductor light-emitting device in a direction departing from the semiconductor light-receiving device at a high reflectivity.

9. The apparatus of claim 8, wherein the substrate is made of quartz glass, silicon crystals or polymers.

10. The apparatus of claim 8, wherein the optical branching filter is an optical element provided to intersect with the optical waveguide.

11. The apparatus of claim 8, wherein the optical waveguide is a core of an optical fiber embedded in a groove formed in the substrate.

12. The apparatus of claim 11, wherein the optical fiber is fixed by a fixing member to the substrate and embedded in the groove, and
    wherein a refractive index of the fixing member is smaller than a refractive index of a cladding of the optical fiber.

13. The apparatus of claim 11, wherein a refractive index of the substrate is smaller than a refractive index of a cladding of the optical fiber.

14. A bidirectional optical semiconductor apparatus comprising:
    a substrate embedding an optical waveguide, through which output light and input light are propagated;
    a semiconductor light-emitting device for emitting the output light toward one end of the optical waveguide;
    an optical branching filter, provided in the optical waveguide, for transmitting at least part of the output light and guiding at least part of the input light to the outside of the optical waveguide;
    a semiconductor light-receiving device, provided over the substrate, for receiving the input light guided by the optical branching filter to the outside of the optical waveguide; and
    a light-absorbing member, provided over part of the substrate other than the optical waveguide, for absorbing the light emitted from the semiconductor light-emitting device.

15. The apparatus of claim 14, wherein the substrate is made of quartz glass, silicon crystals or polymers.

16. The apparatus of claim 14, wherein the optical branching filter is an optical element provided to intersect with the optical waveguide.

17. The apparatus of claim 14, wherein the optical waveguide is a core of an optical fiber embedded in a groove formed in the substrate.

18. The apparatus of claim 17, wherein the optical fiber is fixed by a fixing member to the substrate and embedded in the groove, and
    wherein a refractive index of the fixing member is smaller than a refractive index of a cladding of the optical fiber.

19. The apparatus of claim 17, wherein a refractive index of the substrate is smaller than a refractive index of a cladding of the optical fiber.

20. A bidirectional optical semiconductor apparatus comprising:

a substrate embedding an optical waveguide, through which output light and input light are propagated;

a semiconductor light-emitting device for emitting the output light toward one end of the optical waveguide;

an optical branching filter, provided in the optical waveguide, for transmitting at least part of the output light and guiding at least part of the input light to the outside of the optical waveguide;

a semiconductor light-receiving device, provided over the substrate, for receiving the input light guided by the optical branching filter to the outside of the optical waveguide; and an optical element, provided over part of the substrate other than the optical waveguide, for absorbing the light, emitted from the semiconductor light-emitting device and deviated from the optical waveguide, or for reflecting the light in a direction departing from the semiconductor light-receiving device.

21. The apparatus of claim 20, wherein the substrate is made of quartz glass, silicon crystals or polymers.

22. The apparatus of claim 20, wherein the optical branching filter is an optical element provided to intersect with the optical waveguide.

23. The apparatus of claim 20, wherein the optical waveguide is a core of an optical fiber embedded in a groove formed in the substrate.

24. The apparatus of claim 23, wherein the optical fiber is fixed by a fixing member to the substrate and embedded in the groove, and wherein a refractive index of the fixing member is smaller than a refractive index of a cladding of the optical fiber.

25. The apparatus of claim 23, wherein a refractive index of the substrate is smaller than a refractive index of a cladding of the optical fiber.

26. A bidirectional optical semiconductor apparatus comprising:

a substrate embedding an optical waveguide, through which output light and input light are propagated;

a semiconductor light-emitting device for emitting the output light toward one end of the optical waveguide;

an optical branching filter, provided in the optical waveguide, for transmitting at least part of the output light and guiding at least part of the input light to the outside of the optical waveguide;

a semiconductor light-receiving device, provided over the substrate, for receiving the input light guided by the optical branching filter to the outside of the optical waveguide;

a package for housing the substrate, the semiconductor light-emitting device, the optical branching filter and the semiconductor light-receiving device; and a light-absorbing film, formed on an inner wall surface of the package, for absorbing the light emitted from the semi-conductor light-emitting device.

27. The apparatus of claim 26, wherein the substrate is made of quartz glass, silicon crystals or polymers.

28. The apparatus of claim 26, wherein the optical branching filter is an optical element provided to intersect with the optical waveguide.

29. The apparatus of claim 26, wherein the optical waveguide is a core of an optical fiber embedded in a groove formed in the substrate.

30. The apparatus of claim 29, wherein the optical fiber is fixed by a fixing member to the substrate and embedded in the groove, and wherein a refractive index of the fixing member is smaller than a refractive index of a cladding of the optical fiber.

31. The apparatus of claim 29, wherein a refractive index of the substrate is smaller than a refractive index of a cladding of the optical fiber.

* * * * *